United States Patent

Van Kai

[15] 3,683,339

[45] Aug. 8, 1972

[54] NON-DESTRUCTIVE READ-OUT MEMORY WIRE

[72] Inventor: Tran Van Kai, Paris, France

[73] Assignee: Thomson-CSF

[22] Filed: April 20, 1970

[21] Appl. No.: 29,928

[30] Foreign Application Priority Data

April 25, 1969 France....................69/13222

[52] U.S. Cl....................340/174 PW, 340/174 QA, 340/174 ZB, 340/174 TF

[51] Int. Cl...............................................G11b 5/00

[58] Field of Search ...340/174 PW, 174 QA, 174 ZB

[56] References Cited

UNITED STATES PATENTS 3,531,783 9/1970 Doyle.................340/174 QA

*Primary Examiner*—Maynard R. Wilbur
*Assistant Examiner*—Robert F. Gnuse
*Attorney*—Kurt Kelman

[57] ABSTRACT

A magnetic wire memory element of the non destructive road out kind comprises a core of a non-magnetic conductive material over which are deposited in succession a layer of a soft anisotropic material, a layer of a non magnetic material and a layer of a hard anisotropic magnetic material; the easy magnetic axis of the anisotropic layers extend along the axis of the core. The core is used as a word-wire. The digit and read out wires are wound around the element.

3 Claims, 7 Drawing Figures

NON-DESTRUCTIVE READ-OUT MEMORY WIRE

The present invention relates to wires for magnetic memories in which non-destructive information read-out can be effected.

A magnetic memory may be in the form of a set of parallel magnetic wires forming a mesh with other conductor wires. Each of the magnetic wires of the memory is formed with a metal core covered which a layer of ferromagnetic material. The magnetic material is anisotropic and has an easy magnetic axis and a hard magnetic axis. In the so called "L" type wires, the direction of the easy axis is that of the axis of the wire.

Such wires have so far not been generally used in memories for the following reasons:

In the rest condition, since the magnetic flux closes through the air, it is important that the demagnetizing field due to the magnetic charges which appear at the ends of each memory element, should be small. Accordingly, it is possible to use only thin films. Consequently, the output signals are weak.

Moreover, memories of this kind have destructive read-out. In other words, the read-out demagnetizes each memory element and the information recorded therein is lost.

It is an object of the invention to avoid these drawbacks.

According to the invention there is provided a magnetic wire memory element, comprising in combination: a core of a non-magnetic conductive material, a first layer of a soft anisotropic magnetic material deposited on said wire; a second non magnetic layer deposited on said first layer; a third layer of a hard, anisotropic, magnetic material, deposited on said second layer; the easy magnetic axis of said first and said third layers, extending parallel to said wire.

For a better understanding of the invention and to show how the same may be carried into effect, reference will be made to the drawing accompanying the ensuing description and in which.

Similar reference numbers designate similar parts throughout all the figures.

Figure 1:
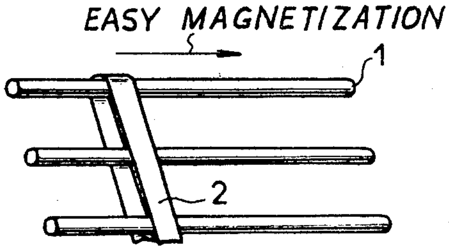
FIG. 1 shows an L-type wire memory.
Figure 2:
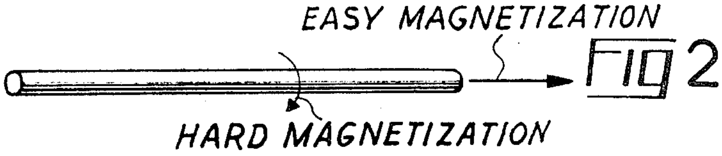
FIG. 2 illustrates an L-type wire and its two directions of magnetization.

In FIG. 1, there can be seen a set of parallel wires 1 forming a mesh with metal conductors 2. The wires 1, in the conventional way, have a metal core. They are covered with an external layer of anisotropic ferromagnetic material. The cores of the wires 1 serve as word wires and the wires 2 serve as digit wires.

In the case of L-type wires, which it is an object of the invention to improve, the easy magnetic axis coincides with the wire axis. The combined effect of the digit and word currents positions the magnetization along this axis, in one direction or the other, depending upon the polarity of the digit current.

Under the effect of the word current alone, during the read-out, a magnetic field is created which is directed circumferentially around the wire, thus destroying the information which, if need be, has to be re-recorded.

At the time of the recording, it is obvious that the lines of force of each memory element (the point of intersection between the digit and word wires), goes through the air. As already mentioned, the result is that a magnetic layer has to be very thin; this means that the output signals are weak.

Figure 3:
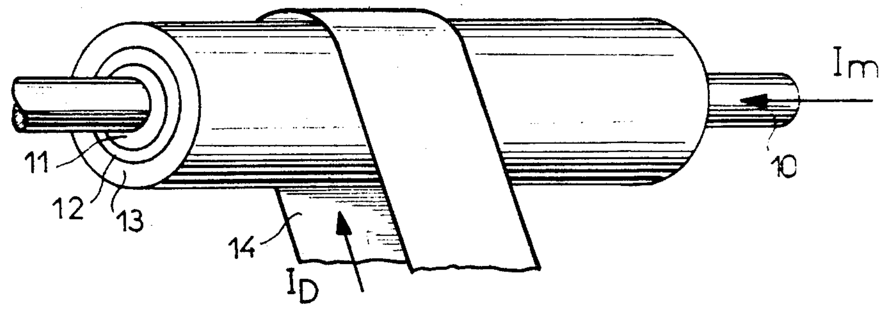
FIG. 3 illustrates a perspective view of an embodiment of a wire memory according to the invention.

FIG. 3 illustrates a wire memory element in accordance with the invention.

It goes without saying that the magnetic layers, as well as the intermediate non-magnetic layer, are continuous. This illustration of an isolated element is given purely in order to provide a better understanding of the mechanism involved. The wire has a cylindrical metal core 10 upon which there are successively deposited three concentric layers, namely a soft ferromagnetic layer 11 of an anisotropic material, which has a low coercive field strength in the easy magnetic axis direction (direction of the wire axis) and a metal or insulating layer 12, which is non-magnetic, and a "hard" ferromagnetic layer 13, the latter having a high coercive field strength in the easy magnetic axis direction. The easy and hard magnetic axis directions of the layer 13 are the same as those of the layer 11.

Around this arrangement, the digit wire 14 is wound, the word wire being formed by the metal core 10.

Figure 4:
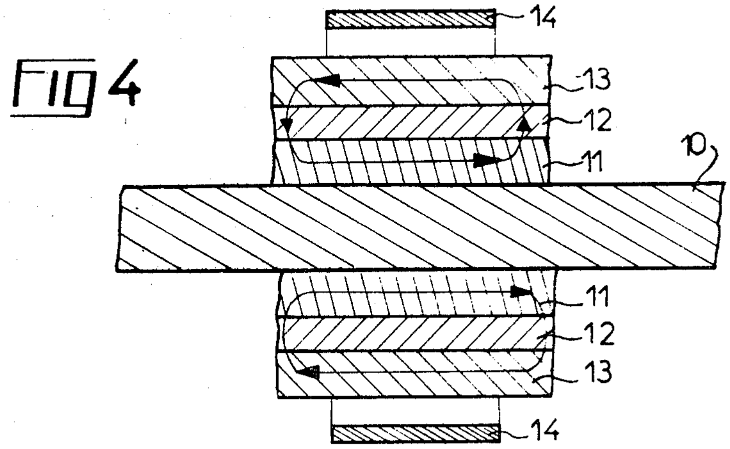
FIGS. 4 and 5 illustrate in longitudinal section a wire memory element in accordance with the invention, showing its states of magnetization at the time of write-in and read-out operations respectively.
Figure 5:
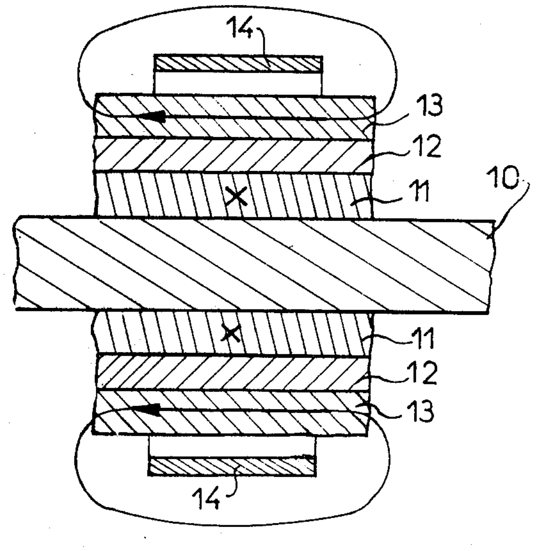

The operation of the assembly will be understood from a consideration of FIGS. 4 and 5.

FIG. 4 illustrates the magnetic condition after the write-in operation. This write-in operation is effected by the successive transmission of a current pulse through the word wire and a current pulse through the digit wire, the amplitudes of the pulses being of an appropriate level of course.

The direction of the magnetization in the layer 13, which was along the hard magnetic axis, is now along one on the other direction along the easy axis, depending upon the direction of the digit current. The flux closes through the layer 11, this layer being magnetically soft and presenting a low-reluctance path. In this layer, the magnetization is thus directed in a direction opposite to that which it takes in the layer 13. There is no flux path in the air, as in known L-wires. The result is that the layers may be thicker and the output currents higher.

FIG. 5 illustrates the effect of the read-out current. This current creates a field directed along the hard magnetic axis. The coercive field strength in the layer 13 in the direction of the hard axis is high so that the read-out current, provided it is sufficiently weak, will not have any effect upon the magnetization of this layer. On the other hand, it will cause the magnetization layer 11 to change state into the hard magnetic axis direction, for the time of duration of the read-out current.

During this time, the magnetizing flux in the layer 13 will no longer be able to close through the layer 11 and will accordingly close through the air instead. In the "read-out" wire, which may be the digit wire itself and which is at any rate directed as the digit wire, there are then induced, with the appearance and disappearance of the flux through the air, two positive and negative pulses, the order of appearance of which represents the sign of the information stored in the wire 14. As soon as the read-out pulse ceases, the flux of layer 13 again closes through layer 11 and the system returns to the state shown in FIG. 4.

The reading out of the memory has thus not destroyed the information.

Figure 6:
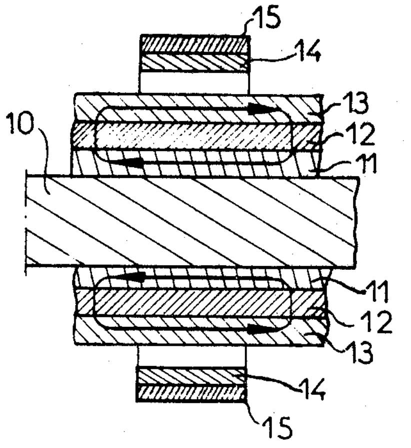
FIGS. 6 and 7 illustrate in longitudinal section the states of magnetization of another embodiment of an L-wire in accordance with the invention.
Figure 7:
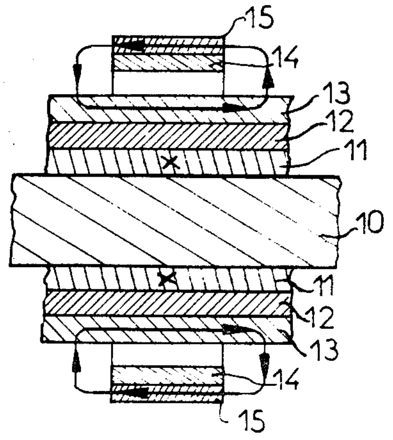

FIGS. 6 and 7 illustrate another embodiment.

The wire 14 carries a layer of ferrite layer 15 the magnetic permeability of which is higher than that of air, but lower than that of the layer 11.

Thus, when the writing in takes place, the flux in the layer 13 continues to close through the layer 11. However, at the instant of the read-out, the flux as shown in FIG. 7, closes through said ferrite layer. This layer is made, for example, of flexible ferrite. It goes without saying that this layer improves the efficiency of the system. In other words, the flux through the hard layer is then channelled through the layer 15, although this is not absolutely essential.

By way of a non-limitative example, the wire may have a diameter of 120/$\mu$.

The hard layer is for examples, made of a nickel-iron cobalt or cobalt-iron or nickel-cobalt alloy or simply of cobalt, and its thickness is in the order of some few thousands of angstrom units to 1 micron.

The soft layer is made, for example, of an alloy of 20 percent iron, 80 percent nickel, or a nickel-iron-cobalt alloy containing a small percentage of cobalt; its thickness is in the order of some few thousands of angstrom units to 1 micron.

What is claimed, is:

1. A magnetic wire memory element for non-destructive information read-out which comprises in combination, a word wire, said word wire having a wire core of non-magnetic conductive material, a first layer of a soft ferromagnetic anisotropic magnetic material deposited on said core and having a low coercive field strength in the easy magnetic axis and parallel to said core, said first layer composed of a member selected from the group consisting of a composition of iron and nickel and said composition with a small percentage of cobalt added, a second non-magnetic layer deposited on said first layer, a third layer of hard anisotropic magnetic material deposited on said second layer and having a high coercive field strength in the easy magentic axis and parallel to said core, said third layer composed of a member selected from the group consisting of nickel-iron-cobalt alloy, cobalt-iron alloy, nickel-cobalt alloy and cobalt; and a digit wire wound around said word wire; means for write-in by successive transmission of a current pulse through the word wire and a current pulse through the digit wire thereby effecting direction of magnetization in the first and third layers parallel to said core; and current means for non-destructive read-out, said current means creating a magnetizing flux through said third layer parallel to said core about said digit wire and closed external of said word wire whereby after effecting read-out, magnetizing flux returns to the direction of magnetization effected by write-in in the first and third layers parallel to said core.

2. The magnetic wire memory of claim 1 wherein the magnetizing flux for read-out is closed through the air.

3. The magnetic wire memory of claim 1 wherein the word wire includes a coating of flexible ferrite and wherein the magnetizing flux for read-out is closed through said flexible ferrite.

* * * * *